United States Patent
Malburet

[15] 3,679,073
[45] July 25, 1972

[54] APPARATUS FOR HANDLING FRAGILE SHEETS

[72] Inventor: Rene A. Malburet, Villeneuve-Saint-Georges, France

[73] Assignee: Compagnie de Saint-Gobain, Neuilly-sur-Seine, France

[22] Filed: Feb. 13, 1970

[21] Appl. No.: 11,096

[30] Foreign Application Priority Data

Feb. 13, 1969    France.................................6903391

[52] U.S. Cl. ............................214/1 Q, 214/1 BV, 214/7, 214/8.5 D
[51] Int. Cl. .....................................B65g 57/28, B65g 61/00
[58] Field of Search..................214/512, 514, 7, 8.5 D, 6 FS, 214/1 BD, 1 BV, 2.5, 1 Q

[56] References Cited

UNITED STATES PATENTS

| | | | |
|---|---|---|---|
| 3,326,547 | 6/1967 | Walters et al.......................214/6 FS X |
| 2,935,218 | 5/1960 | Fritz ........................................214/512 |
| 3,145,786 | 8/1964 | O'Neill et al.........................214/2.5 X |
| 3,279,664 | 10/1966 | Lynch....................................214/7 X |
| 3,259,255 | 7/1966 | Cresci................................214/512 X |

*Primary Examiner*—Robert J. Spar
*Attorney*—Dale A. Bauer, John L. Seymour and Bauer and Seymour

[57] ABSTRACT

The handling of fragile sheet, e.g. glass sheet, because of its fragility, is extremely delicate and difficult. The machines for doing it have been complex and difficult to maintain in satisfactory working order. The present invention remedies these disadvantages in both loading and unloading glass sheet from a support by a machine which picks up the sheet from a horizontal conveyor, turns it to a more or less vertical position parallel to the front receiving face of the support, then moves it in a straight line parallel to the sole plate of the support, the starting position of the sheet being chosen in such a manner that its front edge runs along the said sole plate. If a sheet of glass has already been deposited it is not damaged by the edge of the sheet. In the same way, when this device is unloading, the sheet of glass resting on the support in a more or less vertical position carries out the reverse movement; its first motion is in a straight line, which is followed by a rotating movement onto a horizontal surface. This versatile machine can be economically operated and is manufactured at low cost.

2 Claims, 10 Drawing Figures

INVENTOR.
RENE ALBERT MALBURET
BY
Bauer and Seymour
ATTORNEYS

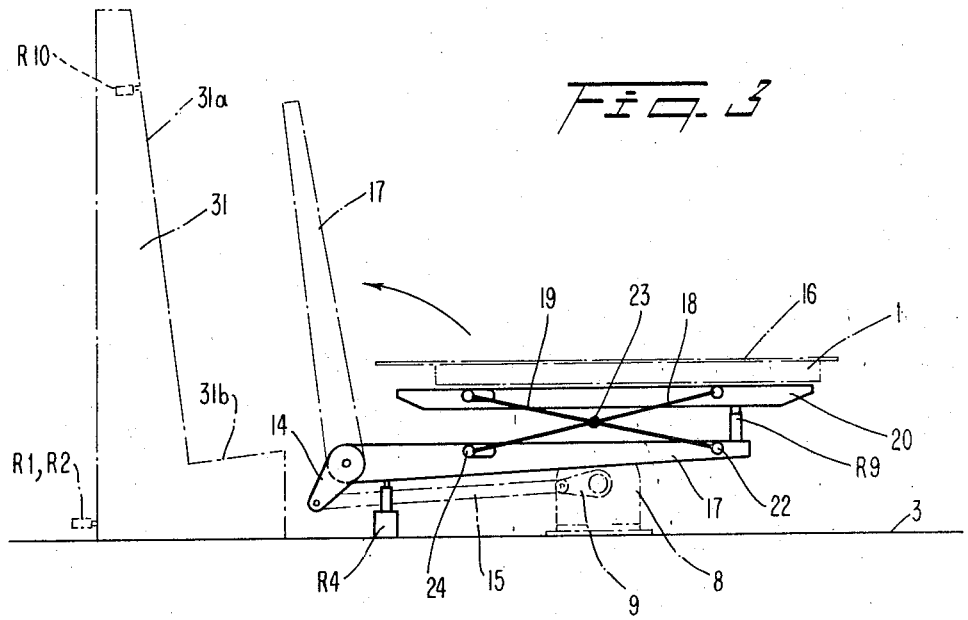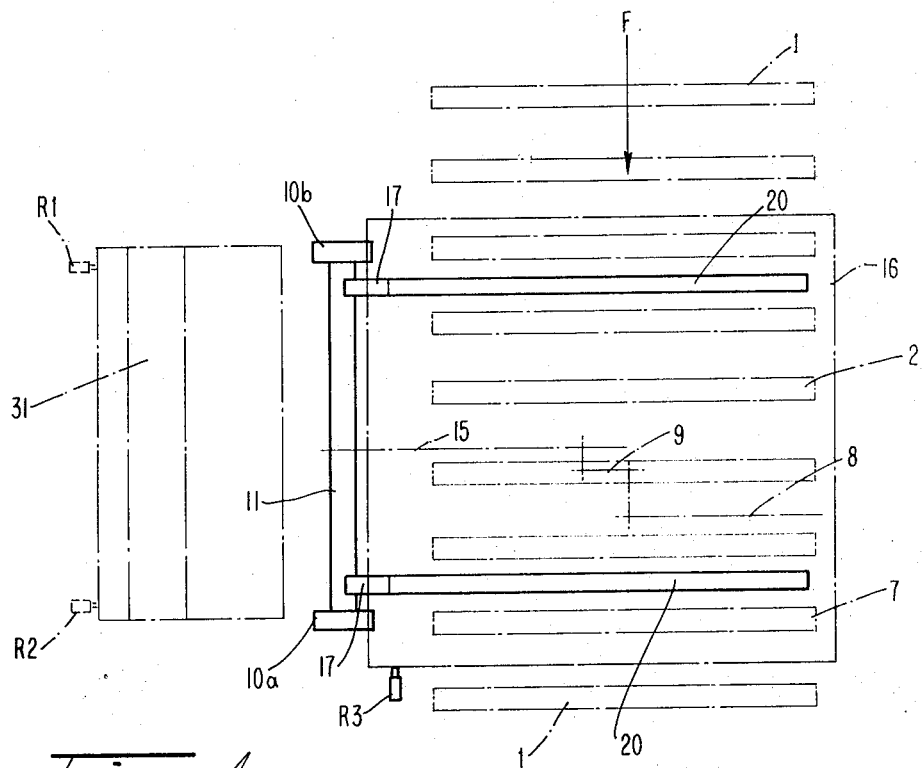

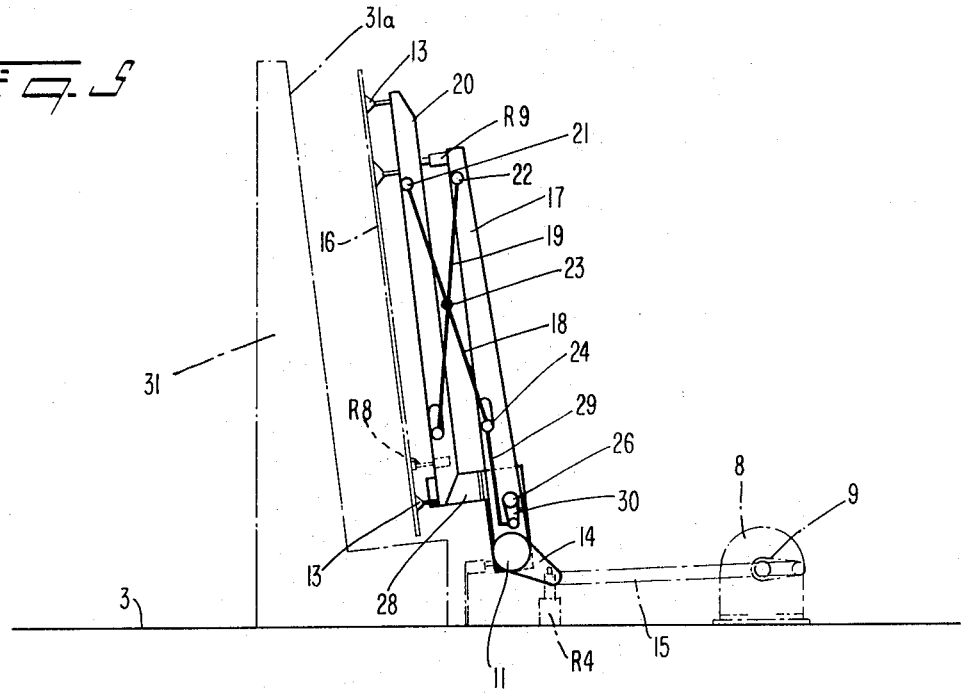
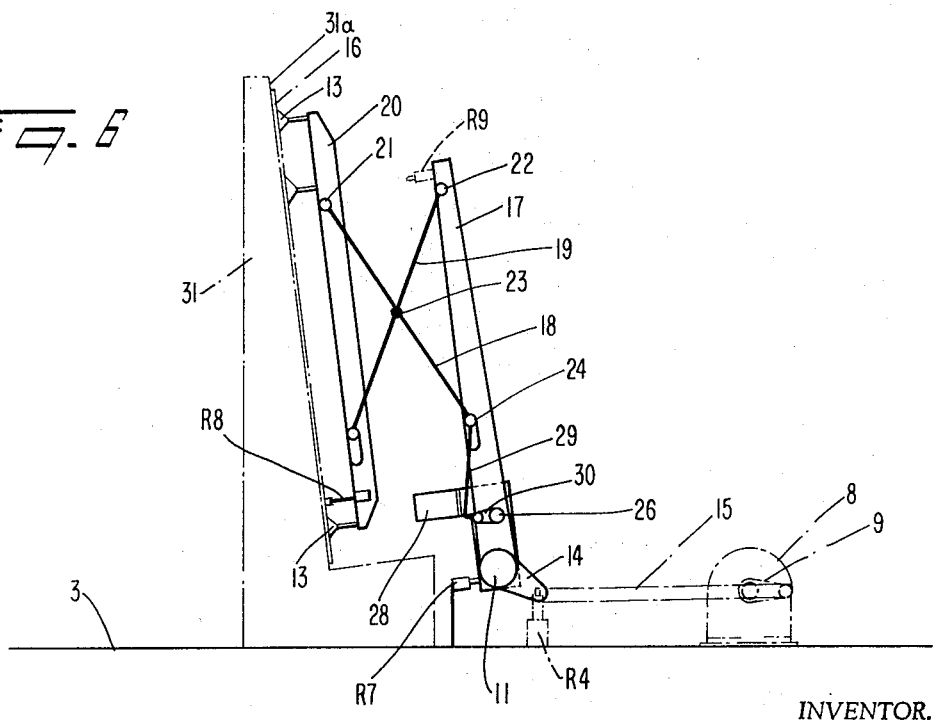

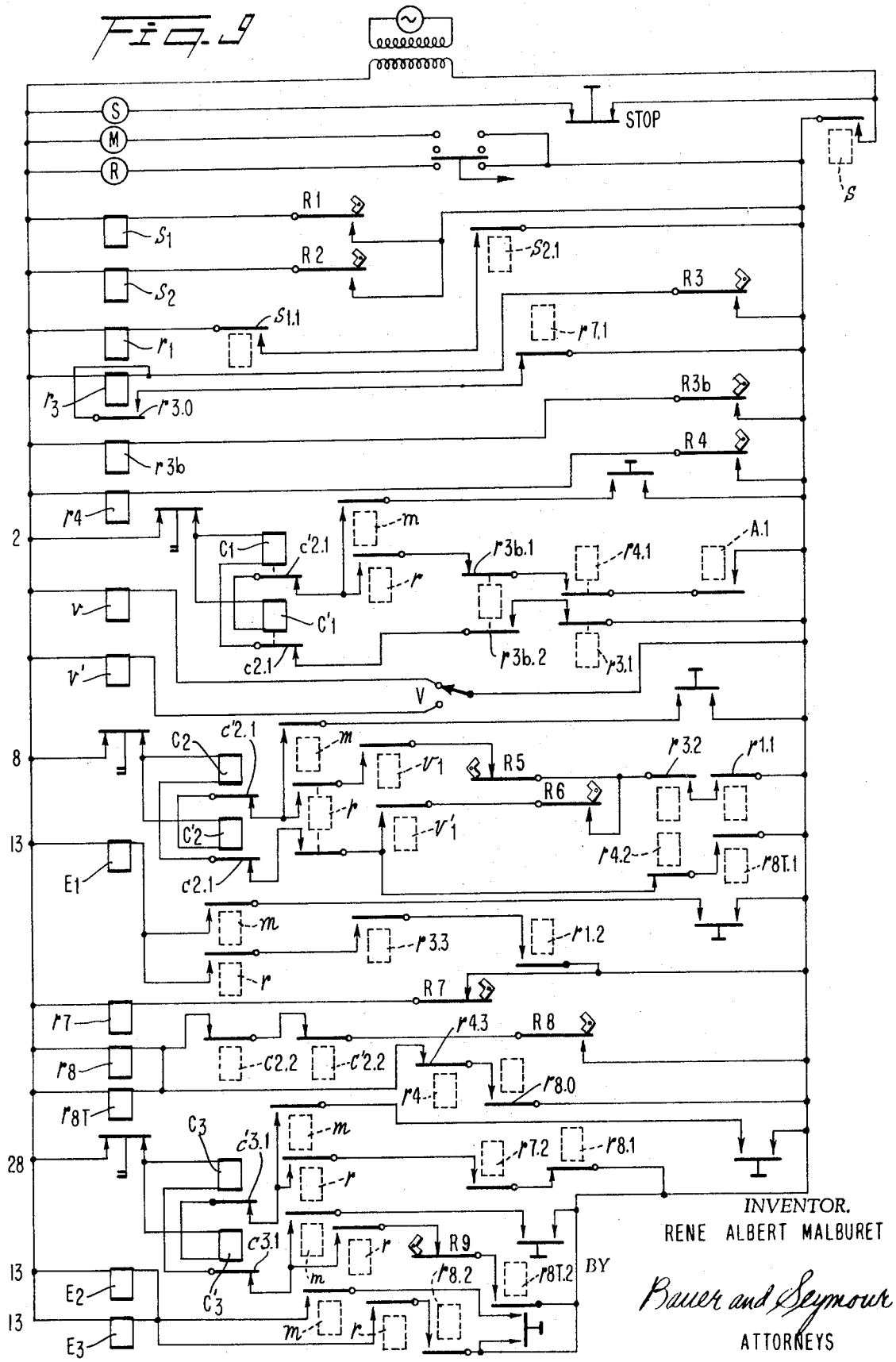

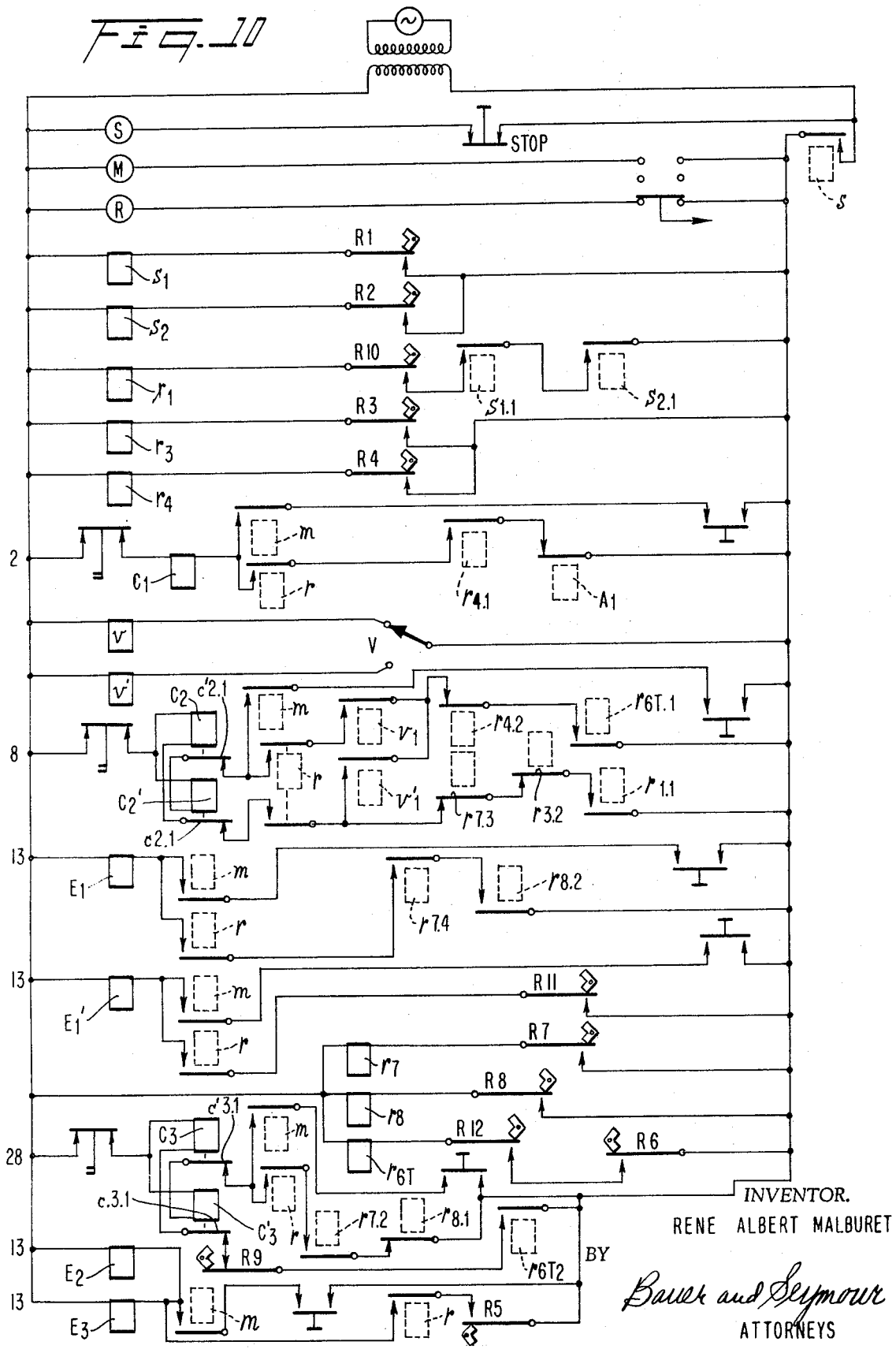

APPARATUS FOR HANDLING FRAGILE SHEETS

The present invention concerns a machine with nozzles permitting glass sheets to be seized on a horizontal carrier, lifted, and deposited in more or less vertical stacks on a movable support called a "desk." This machines also permits the carrying out of the reverse operation which consists of taking a sheet of glass from a stack on a desk and depositing it on a horizontal surface.

In factories, glass sheets coming from manufacture are carried horizontally on carriers to a storage space. It is known to take glass sheets arriving at the end of the carrier with the help of a machine called a "lifter" and to place them in stacks on a desk in such a way that the lower edge of one sheet comes in contact with the lower edge of the preceding sheet already in place on the desk. The desk, when loaded, is taken to storage.

This operation of depositing a glass sheet against or in contact with a sheet already in place is very delicate. In fact the sheets must be applied against each other without leaving any empty space at their base; improper placing of one sheet against the other may effect breakage of the glass under force exerted by the sheets subsequently stacked. Further, since the sheets are sharp along the edges formed by cutting them from a continuously-formed ribbon, such edges may, if the sheets are improperly manipulated, cause deleterious scratching of the sheet immediately previously emplaced.

Moreover, when sheets thus stacked on desks are removed therefrom to feed cutting machines or to ship them to customers, feeding must be rapid to afford economical handling. For this there is usually employed a frame provided with several nozzles, moving on a truck or suspended by a cable from the superstructure. The frame maneuvered by hand by a workman picks up a stacked sheet from the desk due to the vacuum to which the nozzles are subjected, picks it up and transports it to the packing area or on a conveyor which moves it toward the transforming or cutting machines. This process is expensive because it requires a relative large amount of labor; also, mishaps inherent in any manual operation cause breakage which make the operation more expensive. Finally the regular and rapid feeding rhythm of the machines is very difficult for a workman to follow. There have been conceived numerous devices to carry out mechanically these various operations. Thus for the operation of loading desks with sheets arriving by a horizontal conveyor, there have been developed machines consisting essentially of a support for nozzles pivoting around a shaft and depositing the sheet at a fixed point. With these machines it is necessary after each sheet is placed to move the receiving desk by an amount equal to the thickness of the sheet. To avoid moving the desk, machines have also been developed which effect a movement of the machine itself by a distance which is a function of the thickness of the stack of sheets already in place on the desk.

To unload sheets from the desks, known mechanical devices utilize the principle of a nozzled sheet support pivoting around a shaft. It is also necessary for these devices to move the desk as the thickness of the stack of sheets decreases or conversely to move the machine toward the desk.

The construction, maintenance and operation of these machines is difficult so that they have not been widely used.

The present invention remedies these disadvantages in both the loading and unloading of the desks by providing a device which makes it possible to turn a sheet of glass picked up from a horizontal conveyor to a more or less vertical position parallel to the front receiving face of the desk, then to move the sheet in pure translation parallel to the sole plate of the desk, the starting position of the sheet being chosen in such a manner that its front edge then runs along the said sole plate. The sheet of glass already deposited is not damaged by the edge of the sheet being moved. In the same way, when the device of the present invention is unloading, the sheet of glass resting on the desk in a more or less vertical position is given a movement which is the reverse of that just described; in a first motion it carries out a straight-line motion, then is carried by a rotating movement onto a horizontal surface. The invention can be economically operated and manufactured at low cost; the device also has a certain number of other advantages which will appear in the course of the description below of an embodiment given by way of example and shown in the accompanying drawing wherein:

FIG. 3 is a schematic view corresponding generally to FIG. 1, to clearly illustrate the manner of operation of the parts;

FIG. 4 is a schematic plan view generally corresponding to FIG. 2;

FIG. 5 is a schematic end elevation depicting the machine in position supporting a sheet and about to deposit the same upon a desk or support;

FIG. 6 is a schematic view corresponding to FIG. 5 but showing the sheet moved into final position on the support;

FIG. 9 is a complete wiring diagram with the parts shown in the positions they assume when the machine is loading; and FIG. 10 is a view corresponding to FIG. 9 but showing the positions of the parts when the machine is performing an unloading operation.

Figure 1:
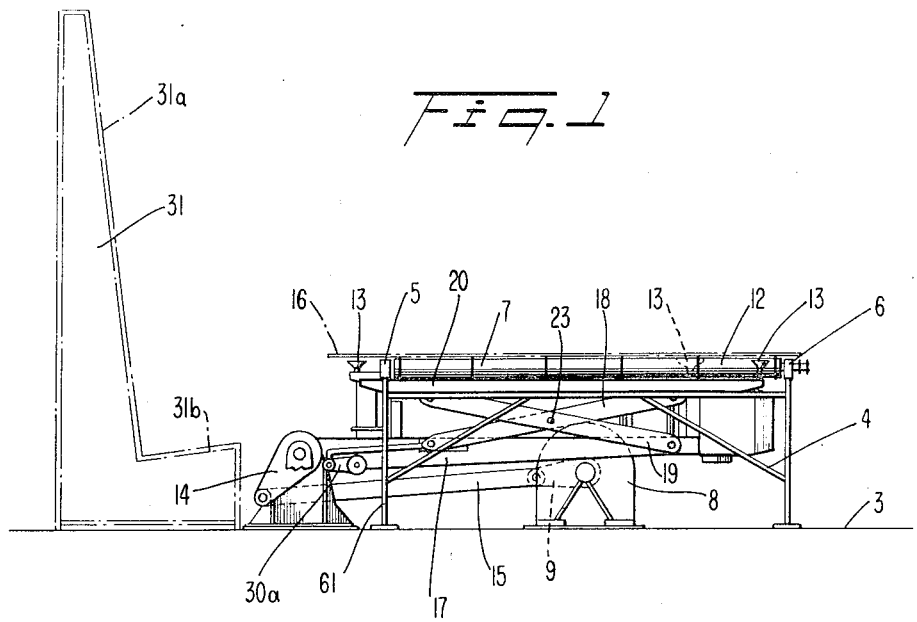
FIG. 1 is an end elevation of the machine shown as horizontally supporting a sheet to be deposited onto an adjacent support or "desk"
Figure 2:
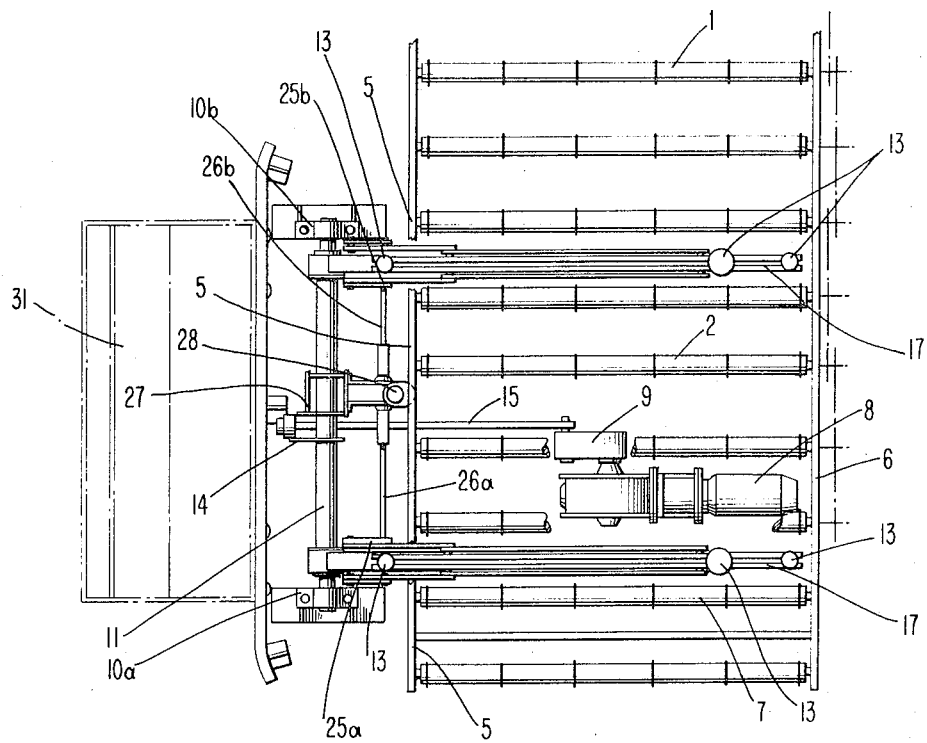
FIG. 2 is a plan view corresponding to FIG. 1 but showing the machine about to deposit the sheet upon the support.
Figure 7:
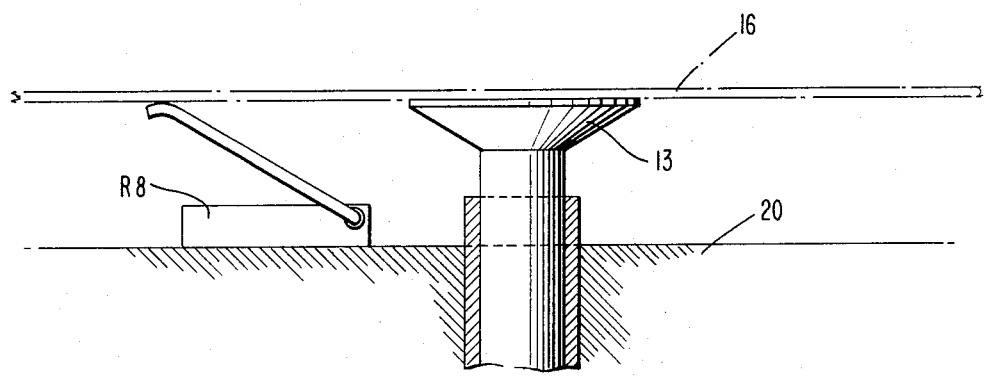
FIG. 7 is a detail view to an enlarged scale, of one of the sheet-contacting vacuum nozzles, with a sheet thereon.
Figure 8:
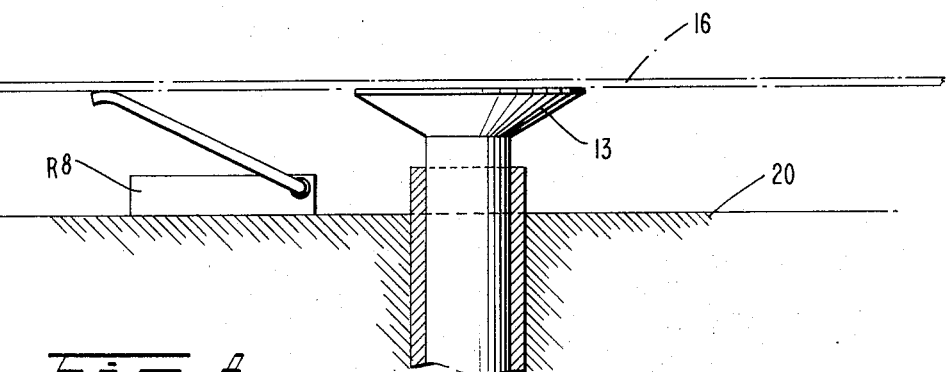
FIG. 8 is a detail view similar to FIG. 7 but showing the sheet in a position lower than in FIG. 7, to thereby actuate a control switch.

The device comprises a base 3 on which is mounted the frame 4 composed essentially of vertical standards 61 on which are fastened two parallel, horizontally-disposed bars 5 and 6, journaling between them a plurality of parallel conveyor rollers 1, 2, 7, etc., jointly forming a conveyor. The axes of all rollers 1, 2, 7, etc. are horizontally coplanar. A motor and speed reducer assembly generally designated at 8, is fixed to base 3. The speed reducer is of the variable speed type and includes an output crank or lever 9. Spaced bearing blocks 10a, 10b, fixed to base 3 journal between them a shaft 11 which, as seen upon FIGS. 1 and 2, is parallel with and at about the same level as the output shaft of assembly 8. A crank 14 has one end fixed to shaft 11 in about the same vertical plane as crank 9. As is clear from inspection of FIG. 2, a link 15 has its respective ends connected to the distal ends of crank 9 and 14, so that shaft 11 is positively rotated by and in synchronism with rotation of the output shaft of assembly 8.

Shaft 11 has fixed thereto near its ends, a respective one of at least two arms 17. The arms are parallel and in first limiting position of pivotal adjustment of shaft 11, extend beneath the plane of conveyor rollers 1, 2, etc., as shown upon FIGS. 1, 2 and 3. In a second or elevated position these arms 17 are raised to about the position shown in dot-dash lines, FIG. 3. From FIG. 2 it is noted that the lift bar as viewed thereon, is provided with gaps or hiatuses to permit pivoting of the arms to essentially vertical position.

Referring in particular to FIG. 3, each arm 17 supports a respective one of a pair of bars 20, by means of a cross-link assembly consisting of links 18, 19, pivotally interconnected at 23 intermediate their ends. One end of link 18 is pivoted to its bar 20 at 18a while its other end is connected with arm 17 at 24, for guided sliding parallel therewith. Likewise, link 19 has one end pivoted to arm 17 at 22 and its other end connected to bar 20 at 19a for pivotal sliding with respect thereto. By the construction just described each bar 20 is constrained to rotate as a unit with the assembly comprising shaft 11 and arms 17, and may also be translated to vary its distance from arm 17 while retaining its essential parallelism therewith. In this regard, compare FIGS. 5 and 6. Parallel bars 20 are rigidly interconnected so that the plane determined thereby is at all times essentially parallel with the plane determined by arms 17. A number of coplanar vacuum cups or nozzles 13 are carried by each of the bars 20, preferably as shown, adjacent the ends thereof. In the aforesaid first limiting position the construction and arrangement are such that the coplanar suction cups lie just below the lower surface of a sheet 16, as shown upon FIG. 1, but are elevated into contact with the sheet immediately upon initial rotation of shaft 11.

The rotation of the speed reducing assembly 8 rotates the shaft 11 via the linkage 9, 14, 15. As bars 20 on which there is the glass sheet 16 pivot as a unit with shaft 11 they move the sheet into a more or less vertical position parallel to the surface of the desk 31, at the moment when shaft 9 reaches its rear neutral or dead center position as shown upon FIG. 5.

At a location near shaft 11, each of the arms 17 has a respective bearing block 25a, 25b, FIG. 2, fixed thereto. Each of these blocks journals the outer end of a respective one of aligned shafts 26a, 26b. The inner or contiguous ends of these shafts extend into and are driven by the output of a speed reducer 28 rigidly carried and fixed with shaft 11 by a bracket 27 and therefore pivoting as a unit with this shaft.

The free or outer ends of the shafts 26a, 26b have fixed thereto respective crank arms, that for shaft 26a being identified at 30a, FIG. 1. The two crank arms are parallel and the free or distal end of each is connected by a pitman such as 29, FIGS. 5 and 6, with a respective one of the slidable pivots such as 24.

Upon FIG. 1, cranks 30 are shown in one limiting position wherein they extend essentially horizontally leftwardly so that pivots 24 are in their extreme leftward positions in their slots in arms 17, and bars 20 are in their closest position to these arms. As speed reducer 28 is operated, it rotates shafts 26a and 26b, synchronously, and correspondingly rotates cranks 30 clockwise as viewed upon FIG. 1. Thereby, pivots 24 are slid equally each along and with respect to its arm 17, and the linkage 18, 19, etc. previously described, acts to move arms 20 as a unit in pure translation to increase their distance from the arms, while retaining exact parallelism therewith, as is clear from comparison of FIGS. 5 and 6.

The general operation of the machine is carried out in the following manner:

The glass sheet advancing on conveyor rollers 1, 2, 7, etc., in the direction of the arrow F as shown in FIG. 4 to conveyor 2 of the machine. On arriving at the proper position with respect to desk 31, the leading end of the sheet activates the double contact R3 which stops the motor driving the conveyors rollers, starts the motion reducer 8 and connects the vacuum to nozzles 13. The two arms bearing the glass sheet pivot around the axis of shaft 11. When the crank 9 actuated by motor reducer 8 acts on contact R7, FIG. 6, the latter shuts off the current feeding motion reducer 8; the sheet is then in a more or less vertical position parallel to the receiving surface 31a of the desk 31 on which the sheets are stacked. At the same time as it stops motion reducer 8, contact R7 starts motion reducer 28 which, via the articulated system 17, 18, 19 and 20 advances the sheet parallel to itself along the sole plate 31b. On one of the bars 20 carrying telescopic nozzles 13 supporting the sheet there is a sensor connected to microcontact R8. When the sheet being deposited touches the sheet previously placed on the desk, the nozzles 13 slide into the supporting sleeves and activate microcontact R8 which stops motion reducer 28, puts the nozzles in the open air and engages a delayed-action relay; this relay is regulated in such a way that after a sheet is placed on the desk, it activates the simultaneous reverse motion of motion reducers 8 and 28. The sheet support returns to its initial position pivoting around the axis of shaft 11. During this movement, the supports 20 of the nozzles return to contact with arms 17; when they reach the end of their course they activate contact R4 which shuts off the circuit of motor 8. Finally, when the arms have reached their starting position, they activate a contact R9 which shuts off motion reducer 28. The machine is then in a position to receive a new glass sheet. The machine may serve to unload glass sheets placed on the desk and place them on a conveyor feeding for example a cutting installation. In this case the machine operates in the following manner:

The desk to be unloaded is placed beside the machine as before. The arms of the machine in a horizontal position pivot around the axis of shaft 11 and are placed parallel to the surface of the glass sheets; the articulated system supporting the nozzles advances, seizes a sheet and retracts. The arms 17 then pivot in the opposite direction around their axis 11 and return to a horizontal position. The nozzles are returned to normal pressure and drop the sheet which is moved away on rollers 7 of conveyor 2. This embodiment described above represents an example of advantageous operation. However, it will be noted that it is possible to employ other solutions to arrive at the same goal without departing from the scope of the invention; particularly it is possible to replace one or several of the motion reducers by pneumatic or hydraulic jacks. The movement of table parallel to the sole plate of the desk may be obtained directly with the aid of a jack replacing the articulated system. In the same way the rollers supporting the glass sheet in the receiving conveyor may be replaced by an air-cushion support. In the same way the machine described for unloading a desk and placing the sheets in a horizontal position may also be provided to place the sheets on a receiving device at any angle to the horizontal.

ELECTRIC CIRCUIT - MACHINE LOADING (FIG. 9)

The loader is turned on; the desk to receive the glass is in the proper position and activates circuit-breakers R1 and R2; the relay r1 is activated and closes contact R1–1 (raising of the arms) and R1–2 (empty).

The arms of the loader, in a horizontal position, activate circuit-breaker R4 which activates relay r4 which closes contact r4–1 and opens r4–2 and r4–3; the loader is in a functioning state when a load arrives.

Switch V permitting a choice of the speed of the machine is for example in the slow-speed position. The slow-speed relay v is activated and the slow-speed relay $v_1$ is closed.

ARRIVAL OF THE LOAD

The load enters the loading section; it activates circuit-breaker R3$^b$ which activates relay r3b. Contact r3b–1 opens; contactor strops the high speed of the conveyor.

Contact r3b–2 closes; contactor C'1 starts the slow speed of the conveyor.

The load activates circuit-breaker R3 activating relay r3 which is then self-fed by R3–0. Contact R3–1 opens, cutting off C'1, which stops the slow speed of the conveyor.

The load is then stopped against a mechanical check.

ROTATION OF THE ARMS

Contact r3–2 is closed; contactor C2 is excited. Contact C2—2 opens to put out of circuit circuit-breaker R8 so as to avoid its premature action. Motor 8 turns at slow speed. Contact r3—3 closes; contactor E1 is activated and swings the switch controlling the electric vacuum valve. Circuit-breaker R4 reopens, preventing the arrival of a new load.

At 30° from the horizontal the arms activate circuit-breaker R5 which stops the rotation and R6 (vacuostat) is not activated by a vacuum sufficient to hold the glass sheet.

STOPPING ROTATION

When the arms are parallel to the glass sheets on the desk, they activate circuit-breaker R, which activates relay r7. Contact r7–1 opens; relay r3 no longer being self-fed opens self-activating contact r3–0, closes contact r3–1 of the conveyor and opens contact r3–2; C2, no longer being activated, stops the rotation motor and recloses contact C2—2.

ADVANCE OF THE NOZZLES

Contact R7–2 closes; contactor C3 is activated and controls the advance of table 20.

STOPPING THE NOZZLES

When the load arrives against the desk or against the loads already in place, the nozzles drop and circuit-breaker R8 is activated; it activates relay r8 and, after a certain regulatable time, the delayed-action relay r8T. Contact r8-0 closes; relays r8 and r8T are self-fed. Contact r8-1 opens; C3 is deactivated and causes the advance of table 20 to stop.

PLACEMENT OF THE LOAD

Contact r8-2 closes, activates contactors E2, which reopen the circuit of vacuum electric valves and E3 allows the nozzles to reach normal pressure.

RETURN OF THE LOADER TO THE HORIZONTAL

Contact r8T-1 closes and activates C'2 which controls the motor 8 which this time by its rotation causes the arms to redescend at high speed.

At the same time r8T2 closes and activates C'3 which causes the retraction of the table supporting the nozzles.

When the support of the nozzles activates circuit-breaker R8, C'3 is deactivated; motor 28 stops.

When the arms activate the circuit-breaker R4, relay r4 is activated; contact r4-1 closes; the conveyor can start if a load waiting on the preceding conveyor has closed regulator A1. Contact r4-2 opens; C'2 is is deactivated; rotation motor 8 stops; r4-3 opens and deactivates r8 and r8T. The loader is then ready to start on a second cycle.

ELECTRIC CIRCUIT - MACHINE FUNCTIONING AS UNLOADER (FIG. 10)

The desk being in a position for unloading activates circuit-breakers R1 (R2). If there is glass on the desk, circuit-breaker R10 is activated and activates relay r1.

ROTATION OF THE ARMS

Contact r1—1 closes; contactor C'2 is activated; motor 8 turns.

STOPPING THE ARMS

The arms being in a high position parallel to the glass on the desk activate circuit-breaker R7 which activates relay r7.

ADVANCING THE NOZZLES

Contact r7-2 closes; contactor C3 is activated; the motor for advancing the nozzle support 28 starts.

STOPPING THE NOZZLES

When the nozzles come into contact with the glass a circuit-breaker R8 is activated which activates relay r8. Contact r8-1 opens, C3 is deactivated, and the motor advance the support stops.

PICKING UP THE GLASS

Contact r8-2 closes; since contact r7-4 is already closed, E1 is activated and controls the electric vacuum valve of the left nozzles.

The upper nozzle, which serves to loosen the glass is mounted on a jack so that it draws back and loosens a corner of the glass load; circuit-breaker R11 then controls the right electric valve by activating E'1.

The right unsticking nozzle by dropping in its turn activates the circuit-breaker R12. When the vacuum is sufficient, it activates circuit-breaker R6 (vacuostat); the delayed action relay r6T is activated after a regulatable time.

ROTATION OF THE ARMS AND RETRACTION OF THE NOZZLES

Contact r6T-1 closes, activating contactor C2 which controls the rotation of the arms at the desired speed.

At the same time, contact r6T-2 closes; contactor C'3 is activated, and motor for retracting the nozzle support starts.

At about 30° to the horizontal circuit-breaker R5 is activated by the passage of the arms; E2 and E3 are activated; the electric vacuum valve is closed; and the electric air valve is opened.

DEPOSITING THE LOAD

The arms of the unloader pass between the rollers of the conveyor and activate circuit-breaker R4, which activates relay r4. Contact r4-2 opens; contactor C2 is deactivated; the rotation of the arms is stopped. The load of glass then activates a circuit-breaker R3 which activates relay r3; contact r3-2 opens; motor 8 can no longer operate.

EVACUATION OF THE LOAD

Contact r4-1 closes and, if the conveyor down stream is free, C1 is activated; the motor actuating the conveyor is started; the load is discharged.

After evacuation of the load, circuit-breaker is no longer activated; the unloader automatically begins a new cycle.

I claim:
1. Apparatus for handling sheets of material, in particular, glass, comprising, a pair of spaced parallel arms connected for movement as a unit and defining a first plane, means mounting said arms at one end thereof for pivoting about a generally horizontal fixed first axis parallel with said first plane and normal to said arms, first power means operable to pivot said arms about said first axis 90°, from a first generally horizontal position to a generally vertical second position, a pair of spaced parallel bars interconnected for movement as a unit and conjointly defining a second plane, said bars being adapted to support a sheet to be handled, a pair of crossed links pivoted together intermediate their ends, each said link being pivoted at one end to one arm and one bar, respectively, and slidably and pivotally connected at its other end to said bar and arm, respectively, and second power means connected with the end of the link slidable on and with respect to said one arm, to translate the pivot therealong and thereby selectively vary the separation of said planes while retaining them parallel.

2. The apparatus of claim 1, means responsive to positioning of said arms in said first position, to control said second power means to maintain the separation of said planes at a limiting miniumum, operation of said second power means to selectively increase the separation of said planes being effected by and in response to pivoting of said arms and bars as a unit out of said first position, toward said second position.

* * * * *